United States Patent [19]

King

[11] 4,429,341

[45] Jan. 31, 1984

[54] LIGHTNING PROTECTION FOR EXTERNAL SURFACE COMPOSITE MATERIAL OF AN AIRCRAFT

[75] Inventor: Charles H. King, Kent, Wash.

[73] Assignee: The Boeing Company, Seattle, Wash.

[21] Appl. No.: 260,871

[22] Filed: May 6, 1981

[51] Int. Cl.³ .............................................. H02H 3/22
[52] U.S. Cl. ..................................... 361/117; 361/218
[58] Field of Search ................ 361/117, 126, 218, 220

[56] References Cited

U.S. PATENT DOCUMENTS 3,755,713 8/1973 Paszkowski .......................... 361/218
4,237,514 12/1980 Cline ................................... 361/218

Primary Examiner—G. Z. Rubinson
Assistant Examiner—L. C. Schroeder
Attorney, Agent, or Firm—Conrad O. Gardner; B. A. Donahue

[57] ABSTRACT

An ordinary lightning-accessible surface of an aircraft component consisting of a composite material such as a graphite epoxy composite includes one or more layers of dielectric material applied over the exposed composite surface portion of the aircraft, the outermost layer of dielectric material having a binder on the exposed surface thereof for holding a finely divided metal powder distributed uniformly over the surface of the outermost layer of dielectric material.

1 Claim, 1 Drawing Figure

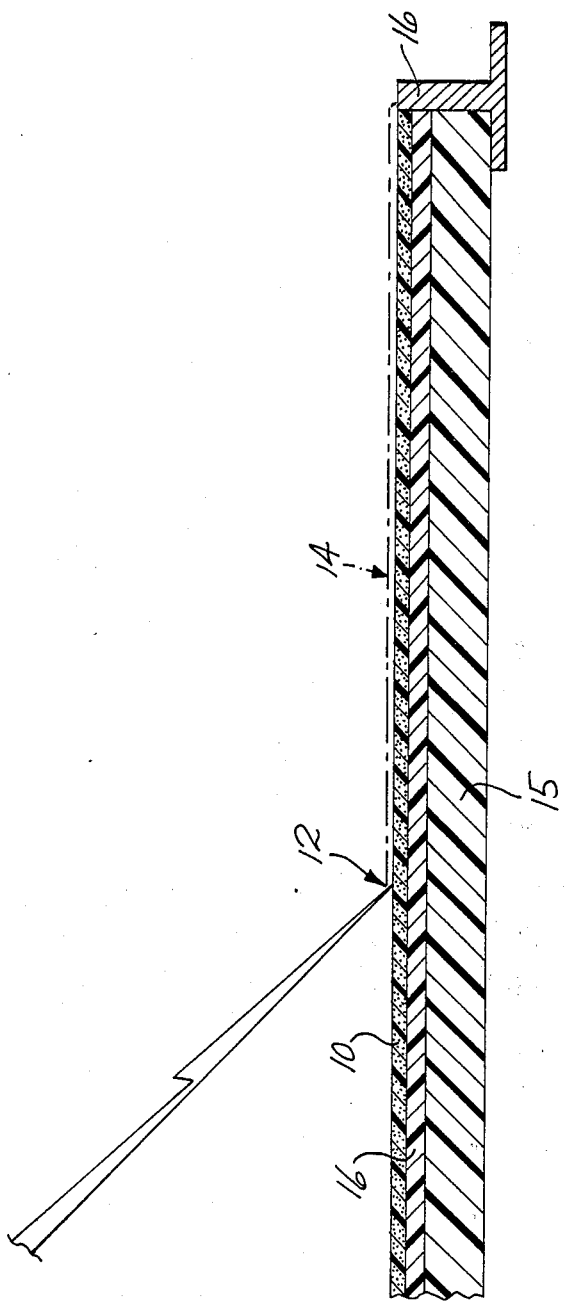

LIGHTNING PROTECTION FOR EXTERNAL SURFACE COMPOSITE MATERIAL OF AN AIRCRAFT

The present invention relates generally to aircraft lightning protection systems and, more particularly, to a lightning protection system for advanced (boron or graphite epoxy) composite aircraft structures. A study of lightning and static electricity related problems with respect to the use of advanced composite structures in aircraft such as boron and graphite epoxy composite structures indicates that lightning protection methods are necessary for such types of advanced structures so that they may be efficiently utilized in various regions of the outer surface of the aircraft. Present and contemplated protection systems utilize metal conductors to shunt lightning currents around the resistive composite materials. Such metal conductors may comprise foils, straps, screens, or flame-sprayed material. In such approaches the current is generally shared by the composite with possible consequent result in damage to the composite structure of the aircraft.

Heretofore, the patent literature, e.g., U.S. Pat. No. 4,186,237, issued Jan. 29, 1980, has been illustrative of the utilization of a material laid over thermally and electrically conductive layers which is capable of releasing a cloud of ionized and ionizable particles to spread the area affected by a lightning flash and to fan out the current path.

Further exemplary of the patent literature is U.S. Pat. No. 4,237,514, issued Dec. 2, 1980, which shows a lightning diverter strip for utilization on an aircraft component, the lightning strip having an epoxy coating or layer of uniformly dispersed powdered metallic particles.

It is an object of the present invention to provide a lightning protection system for the external surface of composite materials used in external surface portions of an aircraft.

A full understanding of the invention, and of its further objects and advantages and the several unique aspects thereof, will be had from the following description when taken in conjunction with the accompanying drawing in which:

FIG. 1 is a cross section through a preferred embodiment of the present invention illustrative of lightning attachment point, and current channnel formation shown diverted around the lightning protection structure provided for the advanced composite structure component of an aircraft.

Turning now to FIG. 1, an exposed surface portion of an aircraft needing lightning protection is comprised of an advanced composite material and shown as a graphite epoxy composite skin panel member 15. A supporting aircraft structural component for skin panel member 15 is shown as metal support member 16 providing a reference potential point. A layer of dielectric material, e.g., Kapton (a polyimide), is shown having the lower surface thereof applied to the outer surface of composite skin panel member 15 to be protected from lightning. The upper surface of dielectric layer 16 includes a binder material 10 carrying a conductive metal powder of finely divided particles uniformly deposited along the upper surface area of dielectric layer 16. Binder 10 carrying finely divided metal particles may comprise an epoxy binder and conductive metal powder of finely divided aluminum as shown, for example, in hereinbefore-mentioned U.S. Pat. No. 4,237,514.

Dielectric layer 16 may comprise the hereinbefore-mentioned material which has a high characteristic voltage breakdown or other dielectric material having a high dielectric strength with respect to voltage breakdown; and, the thickness of dielectric layer 16 should be between 0.01 inches and 0.1 inches, the thickness of dielectric layer 16 being dependent upon the distance of dielectric protective layer 16 and reference potential as provided by adjacent metal support structure such as 16. The further that dielectric layer 16 is located from the ground reference member, the greater the thickness being required for dielectric layer 16.

A lightning strike attachment point 12 is seen in the embodiment of the present invention shown in FIG. 1 to result in a current channel 14 being formed between lightning attachment point 12 and metal support structure member 16, the current path 14 being diverted around composite structure member 15 by the action of the uniformly distributed metal particles in a supporting binder shown at 10 above dielectric layer 16. The present lightning protection system for external surface composite material of an aircraft should be utilized to provide lightning protection to composite material members located where either a direct stroke or a swept stroke has an increased likelihood of occurrence due to particular location on the aircraft.

What is claimed is:
1. A lightning diverter structure for an aircraft external surface portion of composite material comprising in combination therewith:

a layer of dielectric material having a lower surface adapted to be applied to the aircraft external surface portion of composite material, said layer of dielectric material having an upper surface comprising a major surface area opposite said lower surface;

a binder on said upper surface containing a conductive metal power of finely divided metallic particles deposited in said binder and uniformly extending over said upper surface;

an aircraft structural component comprising a metal support member for supporting said aircraft external surface portion of composite material and providing reference potential; and said layer of dielectric material having a thickness of between 0.01 inches and 0.1 inches, said thickness of said layer of dielectric material being greater with increasing distance of said dielectric layer from said metal support member providing said reference potential.

* * * * *